United States Patent [19]
Shimizu et al.

[11] Patent Number: 6,101,286
[45] Date of Patent: Aug. 8, 2000

[54] IMAGE PROCESSING APPARATUS AND METHOD HAVING IMPROVED COLOR-BOUNDARY MIXING

[75] Inventors: Satoshi Shimizu, Omiya; Haruo Fujii; Hiroshi Sasame, both of Yokohama; Tatsuya Kobayashi, Soka; Takashi Kawana, Yokohama; Tetsuya Kobayashi, Kawasaki; Naoki Enomoto, Yokohama; Akihiko Uchiyama, Yokohama; Yoshiro Saito, Yokohama; Yoichiro Maebashi, Kawasaki; Takaaki Tsuruya, Yokohama, all of Japan

[73] Assignee: Canon Kabushiki Kaisha, Tokyo, Japan

[21] Appl. No.: 08/676,092

[22] Filed: Jul. 2, 1996

[30] Foreign Application Priority Data

Jul. 3, 1995 [JP] Japan ................................ 7-167660
Jun. 6, 1996 [JP] Japan ................................ 8-144346

[51] Int. Cl.$^7$ ...................................................... G06K 9/36
[52] U.S. Cl. ........................................... 382/267; 358/538
[58] Field of Search ..................................... 358/453, 532, 358/538; 382/199, 282, 266–268, 264, 269

[56] References Cited

U.S. PATENT DOCUMENTS

| | | | |
|---|---|---|---|
| 4,656,507 | 4/1987 | Greaves et al. | 358/96 |
| 4,731,864 | 3/1988 | Modla | 382/54 |
| 5,052,045 | 9/1991 | Peregrim et al. | 382/30 |
| 5,140,349 | 8/1992 | Abe et al. | 346/160 |
| 5,204,918 | 4/1993 | Hirosawa | 382/41 |
| 5,495,348 | 2/1996 | Sakai et al. | 358/501 |
| 5,495,538 | 2/1996 | Fan | 382/264 |
| 5,563,713 | 10/1996 | Sugiura | 358/298 |
| 5,611,023 | 3/1997 | Hanyu | 382/269 |
| 5,697,011 | 12/1997 | Kobayashi et al. | 399/49 |

FOREIGN PATENT DOCUMENTS

| | | |
|---|---|---|
| 50-93437 | 7/1975 | Japan . |
| 59-32792 | 8/1984 | Japan . |
| 63-231378 | 9/1988 | Japan . |

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

It is an object of this invention to provide an image processing apparatus which, when nonmagnetic monocomponent development is performed, prevents the formation of white gaps in pattern boundaries between different colors and thereby prevents degradation in the image quality of the formed image. To achieve this object, in one embodiment of the invention, the density value VD(n) of the nth pixel on a certain line is applied to the A input terminal of a selector 207, and the density value VD(n−1) of the (n−1)th pixel is applied to the B input terminal of the selector 207. A subtracter 203 calculates the increase of VD(n) from VD(n−1). If a comparator 204 determines that the increase is a predetermined value C1 or less, a selection signal in the selector 207 is so set that the terminal B (the value of the immediately preceding pixel) is selected.

14 Claims, 10 Drawing Sheets

IMAGE PROCESSING APPARATUS AND METHOD HAVING IMPROVED COLOR-BOUNDARY MIXING

BACKGROUND OF THE INVENTION

The present invention relates to an image processing apparatus and method and, more particularly, to an image processing apparatus and method used to perform image formation by using, e.g., electrophotography.

In conventional image processing apparatuses for forming color images by using electrophotography, an electrostatic latent image is formed on a photosensitive drum by irradiating light onto the drum in accordance with image signals of several different colors. This electrostatic latent image is developed by depositing toners of these colors on the image and transferred to a recording medium, thereby obtaining a full-color image.

In the above conventional development process, one of two-component development using a mixture of toner and a carrier and nonmagnetic mono-component development using only nonmagnetic toner is applied.

To perform the two-component development, the mixing ratio (T/C ratio) of the toner to the carrier must be held constant. If the balance of this mixing ratio is lost, the color reproducibility is degraded in the output image to lead to loss of image information. To prevent this, a controller for keeping the mixing ratio constant is necessary. Consequently, the construction of the developing unit is enlarged and complicated and becomes expensive.

In performing the nonmagnetic mono-component development, on the other hand, a device for controlling the mixing ratio such as the one used in the two-component development is unnecessary, since no carrier is used in the development. Accordingly, the construction of the developing unit is simplified, and, e.g., a magnetic field generating means for holding a carrier becomes unnecessary. This makes a small (lightweight) developing unit possible and maintenance of the developing unit easier.

Generally, however, the nonmagnetic mono-component development has the following drawbacks because only a DC voltage is applied between a photosensitive drum and a developing roller.

That is, in the nonmagnetic mono-component development it is necessary to decrease the charge amount of toner to about ⅕ to 1/20 the toner charge amount in the two-component development, in order to well deposit the toner on the photosensitive drum. Consequently, the adhesive force between the developing roller and the toner is weakened, with the result that the toner is scattered to contaminate the interior of the machine when the developing roller rotates.

Also, since the electric field between the photosensitive drum and the developing roller must be increased, it is necessary to raise the withstand voltage of the photosensitive drum. Accordingly, the photosensitive drum becomes expensive. The electric field can be increased by bringing the photosensitive drum and the developing roller close to each other. If this is the case, however, it is necessary to improve the mounting accuracy in order to keep the positional parallelism between the photosensitive drum and the developing roller. Consequently, a precise manufacturing process is necessary, and so an increase in the cost is unavoidable.

To solve these problems of the nonmagnetic mono-component development, various techniques have been proposed. Among other techniques the one disclosed in, e.g., Japanese Patent Laid-Open No. 63-231378, has solved the above problems. In this image processing apparatus, toner is held on a developing roller, and development is performed by superposing a DC component on an alternate electric field between the developing roller and a photosensitive drum.

When color images are formed by using the image processing apparatus described in Japanese Patent Laid-Open No. 63-231378, however, another problem as described below arises. Therefore, this apparatus has not been put into practical use yet.

When one type (one color) of toner is developed in the above conventional image processing apparatus, the parallelism of an electric field on a photosensitive drum is disturbed on the edges of an image. This is illustrated in FIG. 8. In FIG. 8, reference numeral 71 denotes a developing roller; 72, the surface of a photosensitive drum; 76, an electrostatic latent image on the photosensitive drum 72; 73, toner particles deposited on the developing roller; and 74, toner particles forming a visual image of the electrostatic latent image 76. In the above conventional image processing apparatus, the lines of electric force from the photosensitive drum to the developing roller are bent toward the photosensitive drum on the edges of the electrostatic latent image 76. Consequently, no toner particle adheres to a position 75 indicated by the broken line in the electrostatic latent image 76.

Since this phenomenon occurs on the edges of an image, inconvenience such as shown in FIG. 9B takes place in the formed image. FIG. 9B shows the result of the formation of an image, illustrated in FIG. 9A, in which rectangular patterns of colors Y, M, C, and K, each 10 mm in width and 40 mm in length, are arranged adjacent to each other in the direction of image formation (the rotating direction of a photosensitive drum: indicated by the arrows in FIGS. 9A and 9B). FIG. 9B shows that in the image formed by this conventional image processing apparatus, the leading edge, the trailing edge, and the central portion of the image, with respect to the image formation direction, have different image widths.

For example, when the image shown in FIG. 9A in which patterns of different colors are arranged adjacent to each other is formed of 600×600 lines/inch, the resulting image is as shown in FIG. 9B. That is, an image width of 10 mm is kept in the leading and the trailing edges of the image, but the image width is narrowed by approximately 60 to 120 nm in portions 100 μm inside (image formation side) the leading and the trailing edges.

Also, when image information in which rectangular patterns of different colors are arranged adjacent to each other such as shown in FIG. 10A is output, an image in which the boundaries between these colors are blank is formed as illustrated in FIG. 10B.

A narrowing of the central portion of the formed image occurs each time the toner is developed, and so this phenomenon does not occur when monochromatic images are formed. In the formation of full-color images, however, if an image in which the boundaries between Y, M, C, and K are adjacent to each other is formed, no image is formed in these boundaries. As a consequence, the background color (e.g., white) of a recording medium is exposed (to be referred to as a white gap hereinafter). This results in low image quality.

This inconvenience is not limited to the colors of Y, M, C, and K. That is, when an image in which patterns of colors red (R), green (G), and blue (B) are arranged adjacent to each other is formed, white gaps are similarly formed in the boundaries between these colors R, G, and B.

SUMMARY OF THE INVENTION

The present invention has been made to solve the above problems and has as its object to provide an image processing apparatus and method which prevent white gaps from being formed in the boundaries between colors when image formation is performed, thereby preventing degradation of the image quality of the formed image.

To achieve the above object, the present invention discloses an image processing apparatus for supplying a plurality of color-component signals each representing a color-component image to an image forming apparatus for forming a color image by synthesizing the color-component images, comprising extracting means for extracting a boundary in which a predetermined density change exists on the basis of the input color-component signals, and converting means for converting a value of a pixel on a low-density side of the boundary in accordance with the result of extraction by said extracting means.

The present invention also discloses an image processing apparatus comprising input means for inputting an image signal, extracting means for extracting a boundary between a high-density portion and a low-density portion from the input image signal input by said input means, converting means for converting the boundary into a high-density portion, latent image forming means for forming an electrostatic latent image on the basis of the image signal converted by said converting mean s, developing means for developing t he electrostatic latent image with a developer to visualize the image, and output means for outputting the image visualized by said developing means.

An image processing apparatus for forming a color image by synthesizing predetermined color-component images, comprising first calculating means for calculating, for each color component, a difference between a density of a pixel of interest and a density of an immediately preceding pixel of the pixel of interest, second calculating means for calculating, for each color component, a difference between the density of the pixel of interest and a density of a pixel one line before the pixel of interest, selecting means for selectively outputting, as the density of the pixel of interest, one of the density of the pixel of interest, the density of the immediately preceding pixel of the pixel of interest, and the density of the pixel one line before the pixel of interest, on the basis of the outputs from said first and second calculating means, and image forming means for forming an image in accordance with the output pixel from said selecting means.

It is another object of the present invention to alleviate the drawbacks of noncontact development using a nonmagnetic mono-component developer, by performing image data processing.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments of the present invention will be described in detail below with reference to the accompanying drawings.
<First Embodiment>

Figure 1:
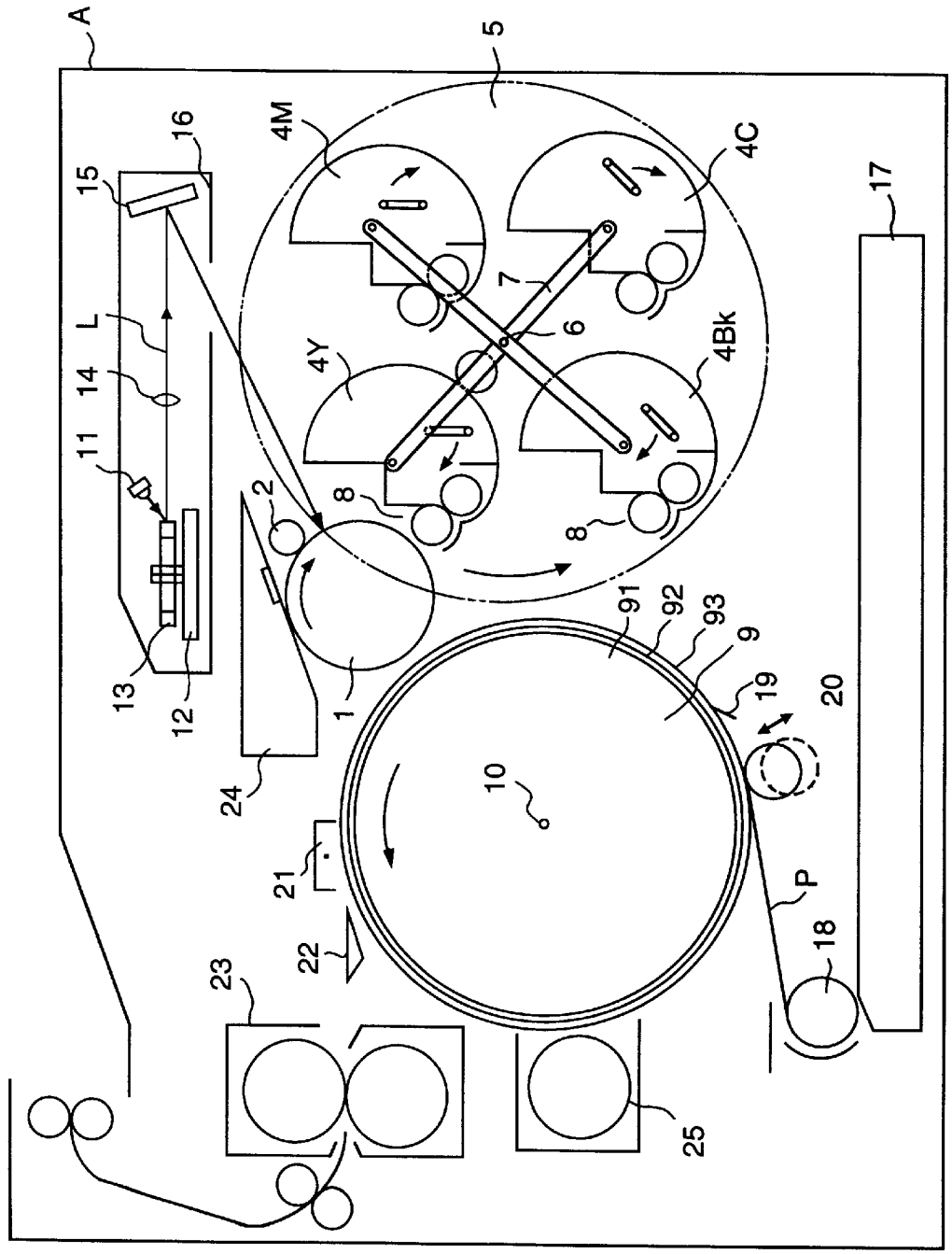
FIG. 1 is a side sectional view of a n image processing apparatus according to one embodiment of the present invention.

FIG. 1 is a side sectional view of a color image processing apparatus according to this embodiment. Referring to FIG. 1, a photosensitive drum 1 as an image carrier and a roller charger 2 are arranged in a substantially central portion of an image processing apparatus A. Toner, a toner container 3, and a developing unit 4 having developing devices 4Y, 4M, 4C, and 4Bk for performing developing are disposed on the right side of the photosensitive drum 1. These developing devices 4Y, 4M, 4C, and 4Bk are carried by a rotatable support 5 and have openings 8 on the same circumference centering around a rotating shaft 6 of the support.

Figure 2:
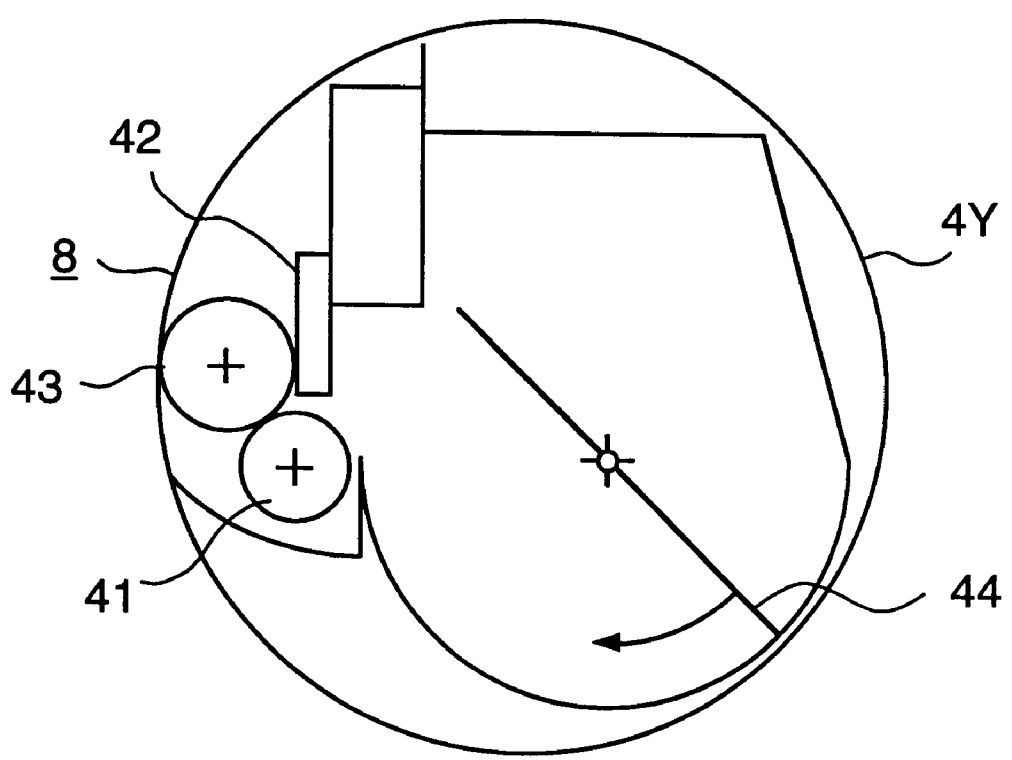
FIG. 2 is a block diagram showing a detailed construction of a developing unit in the embodiment.

The developing devices 4Y, 4M, 4C, and 4Bk contain toners of yellow (Y), magenta (M), cyan (C), and black (Bk), respectively, and have the same construction. A detailed construction of the Y developing device 4Y is illustrated in FIG. 2. As in FIG. 2, the developing device 4Y includes a coating roller 41 as a developer coating member, a toner regulating member 42, a developing roller 43 as a developer carrier, and an agitator 44 which constantly agitates toner. In development, the developing roller 43 rotates and the toner coating roller 41 coats the developing roller 43 with toner. In addition, the toner regulating member 42 applies necessary triboelectricity to the toner. It is preferable that when toner is negatively charged, this regulating member 42 be made from a material, e.g., nylon, which is positively charged, and, when toner is positively charged, the regulating member 42 be made from a material, e.g., silicone rubber, which is negatively charged. That is, a material which is charged to have a polarity opposite to that of toner is preferable.

The peripheral speed of the developing roller 43 can be selected from the range about 1.0 to 2.0 times the peripheral speed of the photosensitive drum 1.

The developing devices 4Y, 4M, 4C, and 4Bk supported by a developing device driving shaft 7 attached to the rotating shaft 6 of the support are so driven that their openings 8 oppose the surface of the photosensitive drum 1 at any instant, such as described in Japanese Patent Laid-Open No. 50-93437 as one driving method.

A transfer roller 9 which is rotatable about a rotating shaft 10 is disposed on the left side of the photosensitive drum 1. The transfer roller 9 holds a transfer sheet P on its circumferential surface and transfers a toner image on the photosensitive drum 1 to the sheet P.

The photosensitive drum 1 is driven in a direction indicated by the arrow at a peripheral speed of 100 mm/sec by a driving means (not shown). The ratio of the diameter of the photosensitive drum 1 to the diameter of the transfer roller 9 is preferably an integral ratio such as described in detail in Japanese Patent Publication No. 59-32792.

In this embodiment, the photosensitive drum 1 is manufactured by coating the outer circumferential surface of an aluminum cylinder 40 mm in diameter with a photoconductive material made from an organic semiconductor (OPC). However, OPC can be replaced by, e.g., a-Si, CdS, or Se.

An optical unit 16 consisting of a laser diode 11, a polygon mirror 13 rotated by a high-speed motor 12, a lens 14, and a turning mirror 15 is arranged above the photosensitive drum 1.

The roller charger 2 is applied with a superposed voltage of a DC voltage of −600 V and an AC voltage with an AC frequency of 1000 Hz and a Vp-p (peak-to-peak) of 1600 V. Consequently, the surface of the photosensitive drum 1 is uniformly charged to substantially −600 V.

When a signal of a yellow image pattern is input to the laser diode 11, the voltage of a portion on the photosensitive drum 1 irradiated through an optical path L becomes substantially −100 V. When the photosensitive drum 1 further proceeds in the direction of the arrow, a yellow image is formed on the photosensitive drum 1 by the developing device 4Y.

When the distance between the developing roller 43 and the photosensitive drum 1 is 300 μm, a superposed voltage of a DC voltage of −400 V and an AC voltage with an AC frequency of 3 kHz and a Vp-p of 1.2 kV is applied to the developing roller 43. In this manner so-called reversal development is performed.

The transfer process will be described in detail below. In synchronism with an image on the photosensitive drum 1, a pickup roller 18 feeds a transfer sheet P from inside a transfer sheet cassette. 17 to the transfer roller 9. In this embodiment, the transfer roller 9 is manufactured by winding a 1.8-mm thick foamed urethane elastic layer 92 on a metal cylinder 91 with a diameter of 156 mm and further winding a PVdF dielectric layer 93 as an outer layer. PET also can be used as the dielectric layer instead of PVdF.

In the above construction, the transfer roller 9 is rotated in the direction of the arrow at the same speed as the photosensitive drum 1, and the transfer sheet P is held by a gripper 19. A DC voltage of 1 kV with a polarity opposite to that of the electric charge of toner is applied between the photosensitive drum 1 and the transfer roller 9 by a power supply (not shown), and the yellow toner image on the photosensitive drum 1 is transferred to the transfer sheet P. At the same time, the transfer sheet P is attracted to the transfer roller 9 by the injection of electric charge to the transfer sheet P. It is also possible, where necessary, to previously attract the transfer sheet P by applying a voltage between the transfer roller 9 and an attraction roller 20.

By performing the above process for magenta, cyan, and black, a color image is formed on the transfer sheet P. The resulting transfer sheet P is separated from the transfer roller 9 by a separation claw 22. The color image is fused and fixed on the transfer sheet P by a fixing unit 23 which performs heating and pressing well known to those skilled in the art. Consequently, a color permanent image is obtained.

The toner remaining on the photosensitive drum 1 after the transfer is removed by a cleaning unit 24. It is also preferable, where necessary, to remove the toner on the transfer roller 9 by using a transfer roller cleaning unit 25.

Image processing as the characteristic feature of the present invention will be described below with reference to FIGS. 3 and 4.

Figure 3:
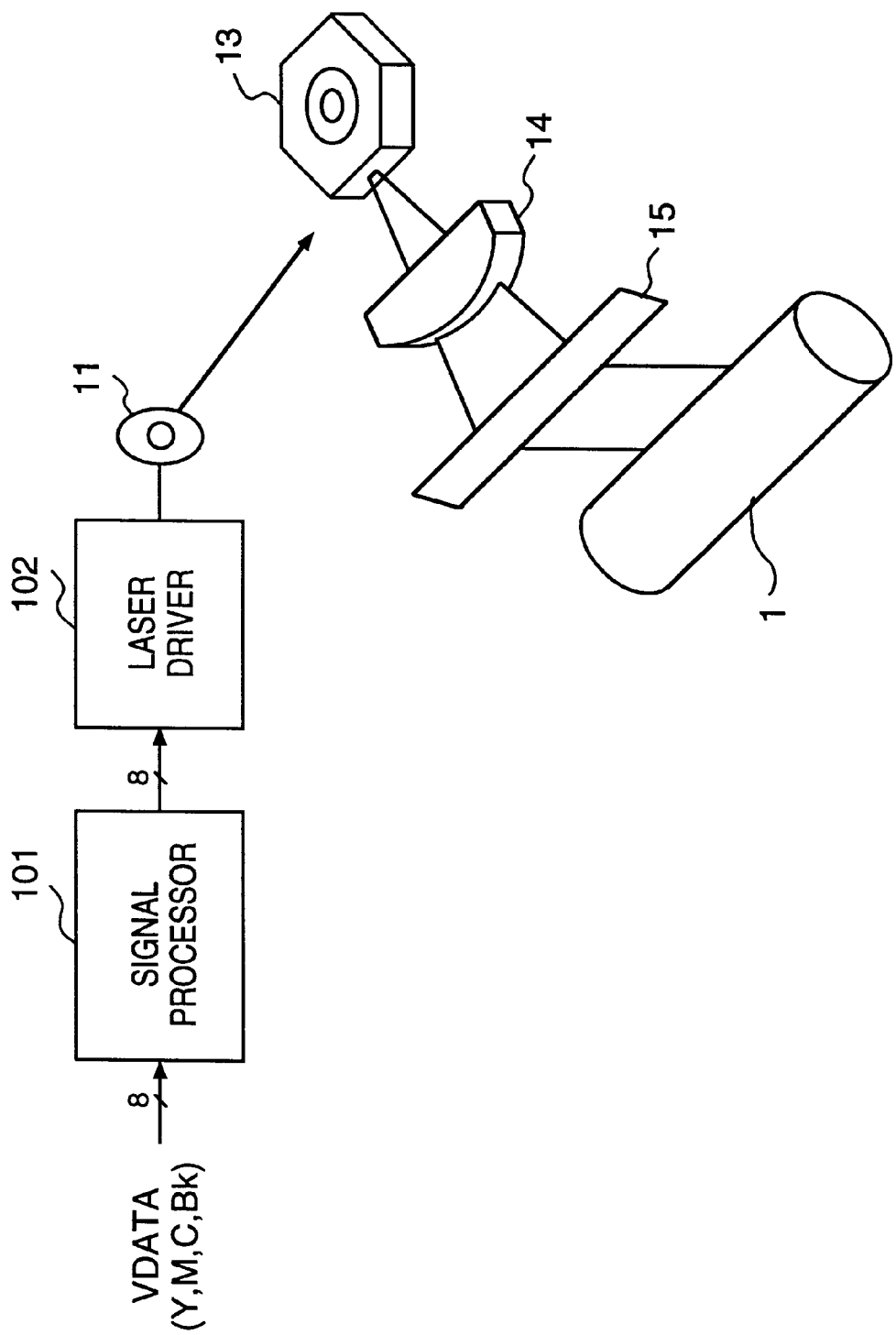
FIG. 3 is a block diagram showing a configuration for processing an image signal in the embodiment.

FIG. 3 shows a configuration which processes an image signal in the image processing apparatus A of this embodiment shown in FIG. 1. The image processing apparatus A of this embodiment is a color laser printer which processes multi-colored images in which each pixel consists of 8 bits. Image data is input in the order of Y, M, C, and Bk in a frame sequential manner.

In FIG. 3, assuming that input image data is VDATA, this VDATA consists of 8 bits and shows a maximum density when it is FFh (255) and a minimum density when it is 00h (0). VDATA is subjected to predetermined signal processing (to be described later) in a signal processor 101 and applied to a laser driver 102. The laser driver 102 converts the input 8-bit digital value into a laser driving signal by performing pulse width modulation, thereby driving the semiconductor laser 11 shown in FIG. 3.

Figure 4:
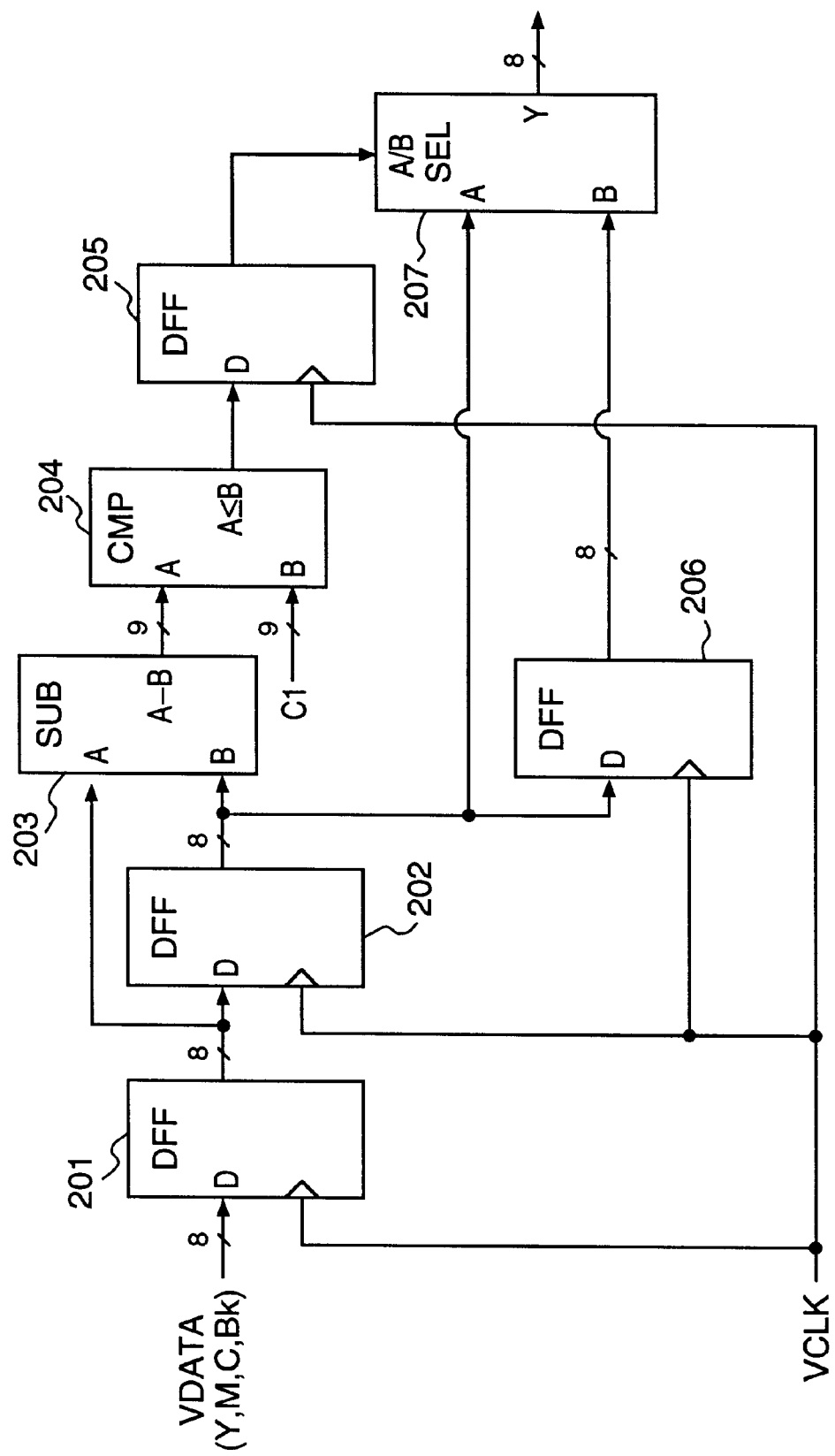
FIG. 4 is a block diagram showing the configuration of a signal processor in the embodiment.

FIG. 4 is a detailed block diagram of the signal processor 101. In FIG. 4, reference numerals 201, 202, 205, and 206 denote D flip-flops (DFFs); 203, a subtracter; 204, a comparator; and 207, a selector. The signal processing in the signal processor 101 will be described in detail below.

The image data VDATA is input in synchronism with a transfer sync clock VCLK. Assuming the nth pixel on a certain line is VD(n), its immediately preceding pixel is indicated by VD(n−1). In the following description, it is assumed that VD(n) is just supplied to the DFF 201 at the leading edge of VCLK.

The DFF 201 outputs VD(n) to the DFF 202 and the A input terminal of the subtracter 203. The DFF 202 outputs VD(n−1) to the B input terminal of the subtracter 203, the DFF 206, and the A input terminal of the selector 207.

The subtracter 203 calculates $$VD(n)-VD(n-1) \tag{1}$$

and outputs the resulting signed 9-bit data to the A input terminal of the comparator 204. The B input terminal of the comparator 204 is applied with a preset signed 9-bit constant C1. If $$VD(n)-VD(n-1) \leq C1 \tag{2}$$

the output from the comparator 204 changes to level H.

If Equation (2) does not hold, the output from the comparator 204 changes to level L.

The output from the comparator 204 is supplied to th e DFF 205 at the leading edge of the next VCLK and input to the selector 207. At this time, VD(n) and VD(n−1) are applied to the A and B input terminals, respectively, of the selector 207, and the output signal from the DFF 205 is used as a selection signal. That is, if th is selection signal is at level L, VD(n) from the A input terminal is output. If the selection signal is at level H, VD(n−1) from the B input terminal is output.

As described above, in the signal processor 101 of this embodiment, if $$VD(n)-VD(n-1) \leq C1$$

holds for the nth pixel of interest on a certain line, the immediately preceding pixel data VD(n−1) is output instead of the nth pixel data VD(n). If $$VD(n)-VD(n-1)>C1 \qquad (3)$$

the nth pixel data VD(n) is directly output.

In this embodiment, therefore, if the density difference between a pixel of interest and its immediately preceding pixel is the predetermined value C1 or less, the immediately preceding pixel is output instead of the pixel of interest. That is, if an increase in the density value of a pixel of interest from that of the immediately preceding pixel is the predetermined value C1 or smaller (i.e., including a decrease), the pixel of interest is replaced by the immediately preceding pixel. In the following description, if an increase in the density value of a pixel of interest from that of the immediately preceding pixel is the predetermined value C1 or less, it is assumed that this pixel of interest belongs to a low-density portion and that the immediately preceding pixel of the pixel of interest belongs to a high-density portion. Since in this case the pixel of interest as a low-density portion is replaced by a high-density portion, this pixel of interest can also be regarded as a boundary.

In forming one main scan line, therefore, if any pixel of interest after the first pixel on the line belongs to a low-density portion, image formation is performed by replacing this pixel of interest with its immediately preceding pixel as a high-density portion. Consequently, the width of drawing of each color component with respect to the original image data is increased. This prevents white gaps from being formed in the formed image even in nonmagnetic monocomponent development. Accordingly, a high-quality image can be obtained without degrading the quality of an original image.

<Second Embodiment>

The second embodiment according to the present invention will be described below. The construction of an apparatus of this second embodiment is identical with that of the first embodiment described above and so a detailed description thereof will be omitted.

In the above first embodiment, whether the pixel of interest is to be replaced is determined in accordance with the density difference between the pixel of interest and its immediately preceding pixel, i.e., in accordance with whether the pixel of interest is a boundary. In the first embodiment, however, this pixel of interest is replaced even when the pixel expresses a fine blank portion with one dot. This leads to degradation of the quality of an image when the image requires a high resolution.

In the second embodiment, therefore, no pixel replacement is performed if the width of a low-density portion is a predetermined width or less. This realizes correction which does not degrade the original resolution of an image.

In the second embodiment, a detailed configuration of the signal processor 101 shown in FIG. 4 in the first embodiment is altered. A detailed configuration of this signal processor 101 in the second embodiment will be described below with reference to FIG. 5.

Figure 5:
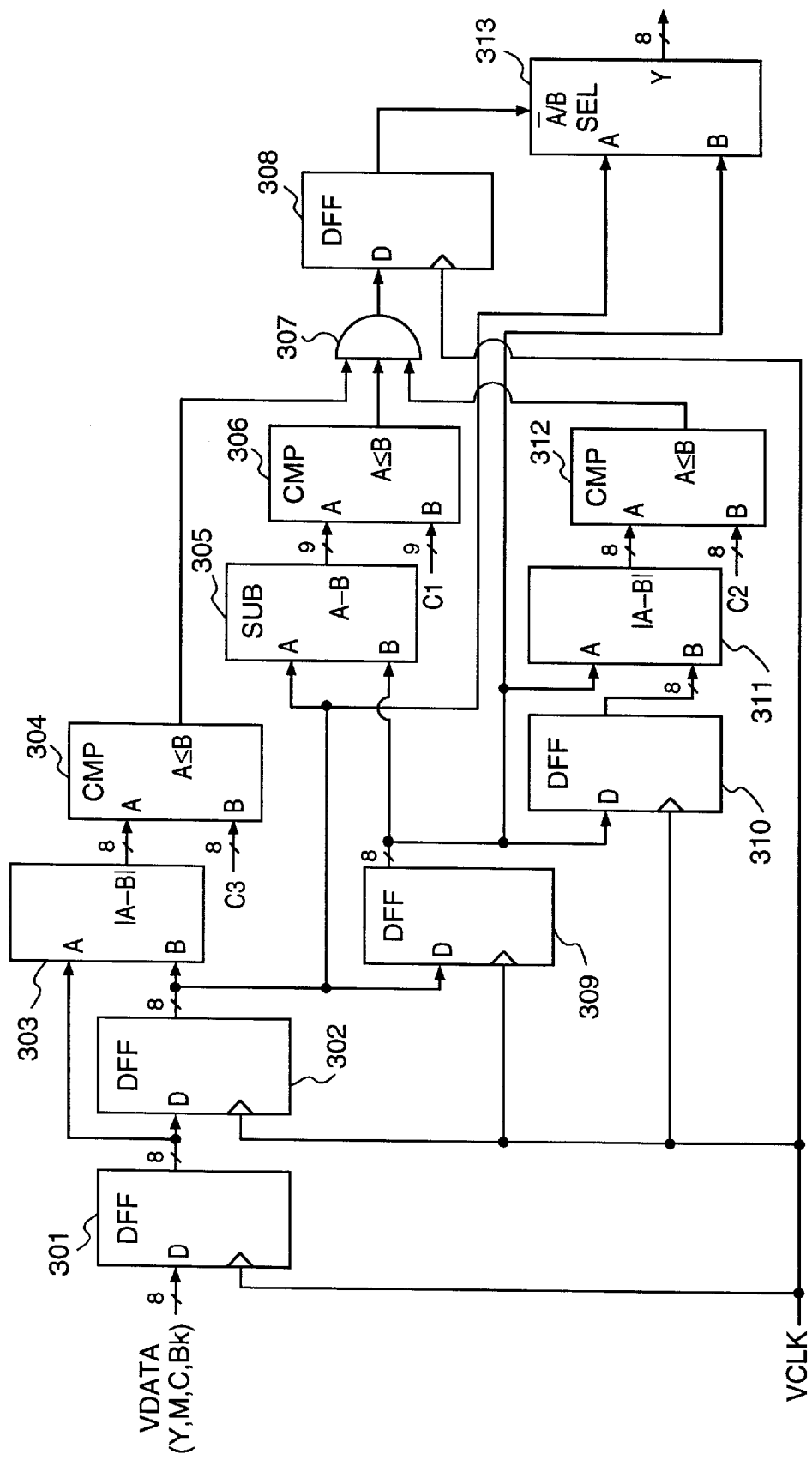
FIG. 5 is a block diagram showing the configuration of a signal processor according to the second embodiment of the present invention.

In FIG. 5, reference numerals 301, 302, 308, 309, and 310 denote D flip-flops (DFFs); 303 and 311, arithmetic units for calculating differential absolute values; 304, 306, and 312, comparators; 305, a subtracter; 307, an AND gate; and 313, a selector. Signal processing in the signal processor 101 of the second embodiment will be described in detail below.

As in the first embodiment described above, image data VDATA is input in synchronism with a transfer sync clock VCLK. Assuming the nth pixel on a certain line is VD(n), the immediately preceding pixel of VD(n) is VD(n−1), the immediately preceding pixel of VD(n−1) is VD(n−2), the immediately succeeding pixel of VD(n) is VD(n+1), and the immediately succeeding pixel of VD(n+1) is VD(n+2). In the following description, it is assumed that VD(n+2) is just supplied to the DFF 301 at the leading edge of VCLK.

The DFF 301 outputs VD(n+1) to the DFF 302 and the A input terminal of the arithmetic unit 303. The DFF 302 outputs VD(n) to the B input terminal of the arithmetic unit 303, the A input terminal of the subtracter 305, the DFF 309, and the A input terminal of the selector 313. The DFF 309 outputs VD(n−1) to the B input terminal of the subtracter 305, the DFF 310 the A input terminal of the arithmetic unit 311, and the B input terminal of the selector 313.

The DFF 310 outputs VD(n−2) to the B input terminal of the arithmetic unit 311.

The arithmetic unit 303 calculates $$|VD(n+1)-VD(n)| \qquad (4)$$

and outputs the result to the A input terminal of the comparator 304. Since a preset constant C3 is applied to the B input terminal of the comparator 304, the comparator 304 compares the two input values. The comparator 304 outputs to the AND gate 307 level H if $$|VD(n+1)-VD(n)| \leq C3 \qquad (5)$$

and outputs level L if $$|VD(n+1)-VD(n)| > C3 \qquad (6)$$

Analogously, the arithmetic unit 311 calculates $$|VD(n-1)-Vd(n-2)| \qquad (7)$$

and outputs the result to the A input terminal of the comparator 312. Since a preset constant C2 is applied to the B input terminal of the comparator 312, the comparator 312 compares the two input values. The comparator 312 outputs to the AND gate 307 level H if $$|VD(n-1)-VD(n-2)| \leq C2 \qquad (8)$$

and outputs level L if $$|VD(n-1)-VD(n-2)| > C2 \qquad (9)$$

Also, the arithmetic unit 305 calculates $$VD(n)-VD(n-1) \qquad (10)$$

and outputs the resulting signed 9-bit data to the A input terminal of the comparator 306. Since a preset constant C1 is applied to the B input terminal of the comparator 306, the comparator 306 compares the two input values. The comparator 306 outputs to the AND gate 307 level H if $$VD(n)-VD(n-1) \leq C1 \qquad (11)$$

and outputs level L if $$VD(n)-VD(n-1) > C1 \qquad (12)$$

Accordingly, the output from the AND gate 307 changes to level H when Equations (5), (8), and (11) above simultaneously hold, i.e., when $$|VD(n+1)-VD(n)| \leq C3$$

and $$|VD(n1)-VD(n-2)| \leq C2$$

and $$VD(n)-VD(n-1) \leq C2,$$

and changes to level L in other cases.

The output from the AND gate 307 is supplied to the DFF 308 at the leading edge of the next VCLK and input to the selector 313. At this time, VD(n) and VD(n−1) are applied to the A and B input terminals, respectively, of the selector 313, and the output signal from the DFF 308 is used as a selection signal. That is, if this selection signal is at level L, VD(n) from the A input terminal is output. If the selection signal is at level H, VD(n−1) from the B input terminal is output.

In the signal processor 101 of the second embodiment as described above, if Equations (5), (8), and (11) above simultaneously hold, VD(n−1) is output instead of the nth pixel data VD(n). In other cases, the nth pixel data VD(n) is directly output.

That is, if the width (corresponding to Equation (8)) of a high-density portion and the width (corresponding to Equation (5)) of a low-density portion adjacent to each other in a boundary (corresponding to Equation (11)) are their respective predetermined values or less, the value of the nth pixel of interest is directly output. Accordingly, the low-density portion is not replaced with the high-density portion.

A practical example of the second embodiment will be described below.

Assume, for example, that C1=−255, C2=0, and C3=0 are set as the constants described above. Accordingly, Equations (5), (8), and (11) are rewritten as $$|VD(n+1)-VD(n)| \leq 0 \qquad (5')$$

$$|VD(n-1)-VD(n-2)| \leq 0 \qquad (8')$$

$$VD(n)-VD(n-1) \leq -255 \qquad (11')$$

These equations indicate that $$VD(n+1)=VD(n) \qquad (5'')$$

$$VD(n-1)=VD(n-2) \qquad (8'')$$

$$Vd(n)=0, VD(n-1)=255 \qquad (11'')$$

When the individual constants are set as above, therefore, the density of the nth pixel is replaced with "255" only when the densities of the nth and the (n+1)th pixels are "0" and the densities of the (n−1)th and the (n−2)th pixels are "255". When the density value of each pixel is replaced under this condition, no pixel replacement is performed if, for example, an image expressing a blank of one dot is formed. Consequently, the blank of one dot is directly expressed.

In the second embodiment as explained above, the density differences between a pixel of interest and pixels before and after the pixel of interest are detected to check whether the pixel of interest is a boundary whose density value is to be replaced with that of the immediately preceding pixel. Therefore, a blank portion to be expressed by one dot is not replaced and this realizes correction with a higher accuracy.

In the above second embodiment, the density differences between a pixel of interest and pixels before and after the pixel of interest are detected. However, the present invention is of course not limited to this embodiment. That is, a low-density portion whose width is smaller than a predetermined width can be accurately expressed by detecting the density differences between the nth pixel of interest and m1 continuous pixels before the nth pixel of interest and the density differences between the nth pixel of interest and m2 continuous pixels after the nth pixel of interest (m1 and m2 are positive integers), thereby checking whether the nth pixel of interest is to be replaced with the (n−1)th pixel.

The replacement of a pixel of interest explained in the above first and second embodiments need not be performed for an image signal on the upstream side and the downstream side in the image formation direction, i.e., the drum rotating direction, since no white gaps are formed in these portions. For example, white gaps are not formed in a portion about 0.1 to 1 mm long extending from the most upstream side, i.e., the leading edge of an image, to an image formation region, and in a portion about 0.1 to 1 mm long extending from the most downstream side, i.e., the trailing edge of the image, to the image formation region. Therefore, the processing can pass through the circuits shown in FIGS. 4 and 5 for these portions so that the replacement of the pixel of interest is not performed.

Each of the above embodiments is explained by taking a case where image data is 8-bit multivalue data as an example, but the present invention is not limited to these embodiments. That is, the present invention is similarly applicable to any image data, e.g., binary data, expressed by the number of bits other than 8 bits.

In the above embodiments, each predetermined value Cn is previously stored in a ROM (not shown). However, this predetermined value can also be stored in a RAM and changed by an operator as needed.

The present invention is not necessarily restricted to the configurations shown in FIGS. 4 and 5 of the first and second embodiments described above. That is, the present invention can take any configuration provided that the configuration has a similar function.

In the embodiments of the present invention as described above, the density value of a pixel of interest is replaced by the density value of the immediately preceding pixel if the difference between the two values is a predetermined value or smaller. As a consequence, the width of a high-density portion can be increased. Accordingly, even in nonmagnetic mono-component development high-quality images can be formed since white gaps can be corrected.

Also, a pixel of interest is directly output when the width of a high-density portion (the width of a region having a small density difference) and the width of a low-density portion (the width of a region having a small density difference) adjacent to each other in a boundary is a predetermined value or less. Consequently, no fine blank expression is disturbed. When nonmagnetic mono-component development is performed, therefore, white gaps formed in the boundaries between different colors can be corrected without decreasing the original resolution of image data of an original, and so high-quality color images can be obtained.

<Third Embodiment>

Figure 6:
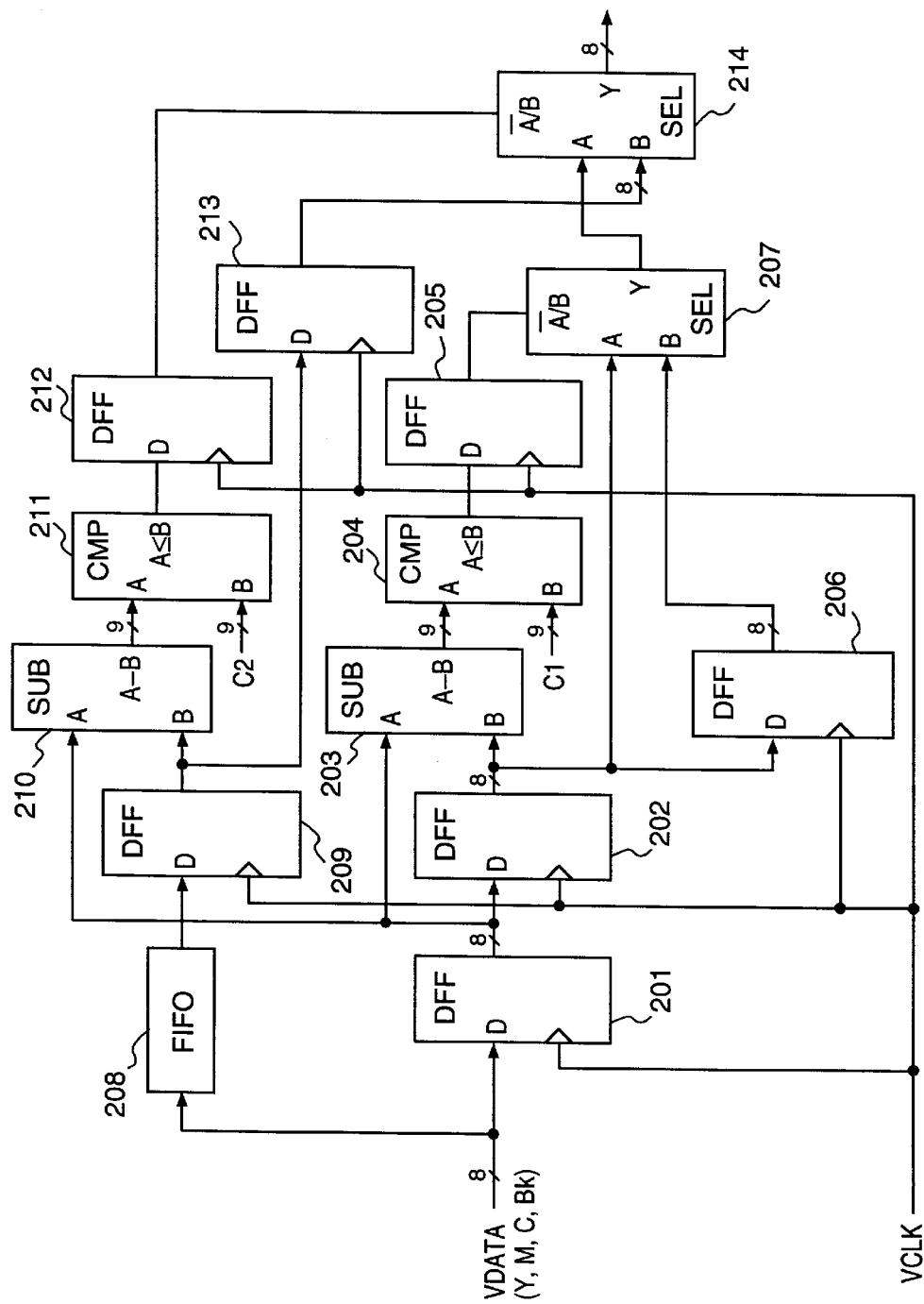
FIG. 6 is a block diagram showing the configuration of a signal processor according t o the third embodiment of the present invention.

FIG. 6 is a block diagram showing the configuration of a signal processor according to the third embodiment of the present invention.

Image data VDATA is input in synchronism with a transfer sync clock VCLK. Assume that data of the nth pixel on the mth line is VD(m,n), data of the immediately preceding pixel of the nth pixel is VD(m,n−1), and VD(m,n) is just supplied to a DFF (D flip-flop) 201 at the leading edge of VCLK. Reference numeral 208 denotes a FIFO memory which stores data of one line.

The DFF 201 outputs VD(m,n) to a DFF 202 and subtracters 203 and 210.

The DFF 202 outputs VD(m−1,n) to the B input terminal of the subtracter 203 and the A input terminal of a selector 207.

The subtracter 203 calculates $$VD(m,n)-VD(m,n-1)$$

and outputs the resulting signed 9-bit data to the A input terminal of a comparator 204.

The B input terminal of the comparator 204 is applied with a preset signed 9-bit constant C1. The output from the comparator 204 goes High when $$VD(m,n)-VD(m,n-1) \leq C1$$

and goes Low in other cases. The output terminal of the comparator 204 is connected to the input terminal of a DFF 205. The output from the comparator 204 is supplied to the DFF 205 at the leading edge of the next VCLK and input to the selector 207. At this time, VD(m,n) and VD(m,n−1) are input to the A and B input terminals, respectively, of the selector 207. When the output signal from the DFF 205 is Low, VD(m,n) from the A input terminal is selected and output to the A input terminal of a selector 214. When the output signal from the DFF 205 is High, VD(m,n−1) from the B input terminal is selected and output to the A input terminal of the selector 214.

The FIFO 208 outputs VD(m−1,n) to a DFF 209. The output from the DFF 209 is input to the B input terminal of the subtracter 210 and subtracted from V(m,n) input to the A input terminal. The result is applied as signed 9-bit data to the A input terminal of a comparator 211.

The B input terminal of the comparator 211 is applied with a preset signed 9-bit constant C2. The output from the comparator 211 goes High when $$VD(m,n)-VD(m-1,n) \leq C2$$

and goes Low in other cases. The output terminal of the comparator 211 is connected to the input terminal of a DFF 212. The output from the comparator 211 is supplied to the DFF 212 at the leading edge of the next VCLK and input to the select terminal of the selector 214. The A input terminal of the selector 214 is applied with the output from the selector 207 as described above. When the output signal from the DFF 205 is Low, the A input is selected and output from the selector 214. When the output signal from the DFF 205 is High, the B input is selected and output from the selector 214.

In this manner, VD(m−1,n) is output instead of the data VD(m,n) of the nth pixel when $$VD(m,n)-VD(m-1,n) \leq C2,$$

VD(m,n−1) is output instead of the data VD(m,n) of the nth pixel when $$VD(m,n)-VD(m-1,n)>C2$$

and $$VD(m,n)-VD(m,n-1) \leq C1,$$

and the data VD(m,n) of the nth pixel is directly output when $$VD(m,n)-VD(m-1,n)>C2$$

and $$VD(m,n)-VD(m,n-1)>C1.$$

Image information is formed by using the output value as the density of the pixel of interest. On the basis of this image information, an image is electrophotographically formed.

As described above, a given pixel of interest is compared with its immediately preceding pixel or with a pixel in the same position on the immediately preceding line of the pixel of interest, and the value of the pixel of interest is replaced in accordance with the difference. Consequently, white gaps in boundary portions can be prevented.

<Fourth Embodiment>

Figure 7:
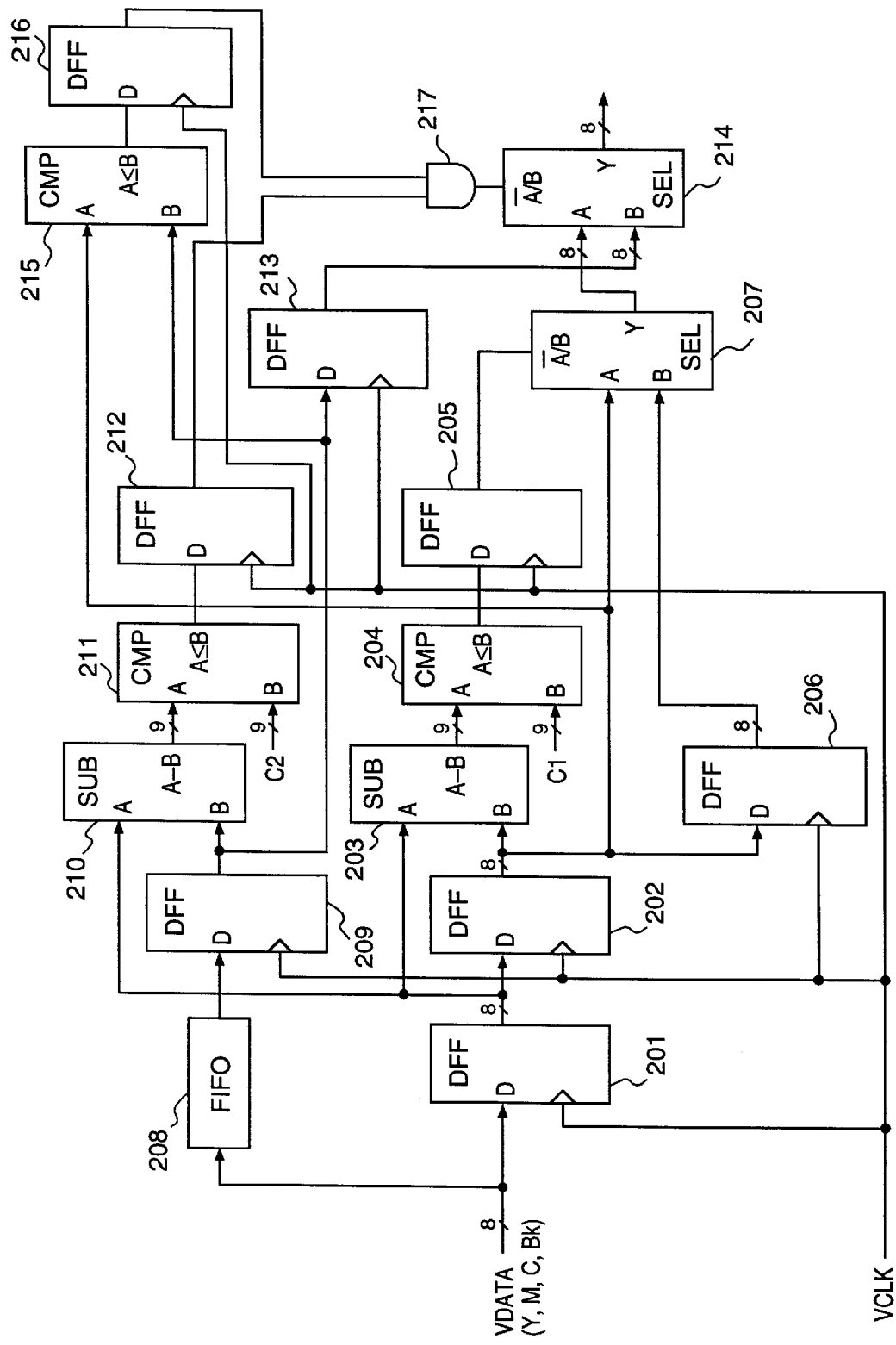
FIG. 7 is a block diagram showing the configuration of a signal processor according to the fourth embodiment of the present invention.
Figure 8:
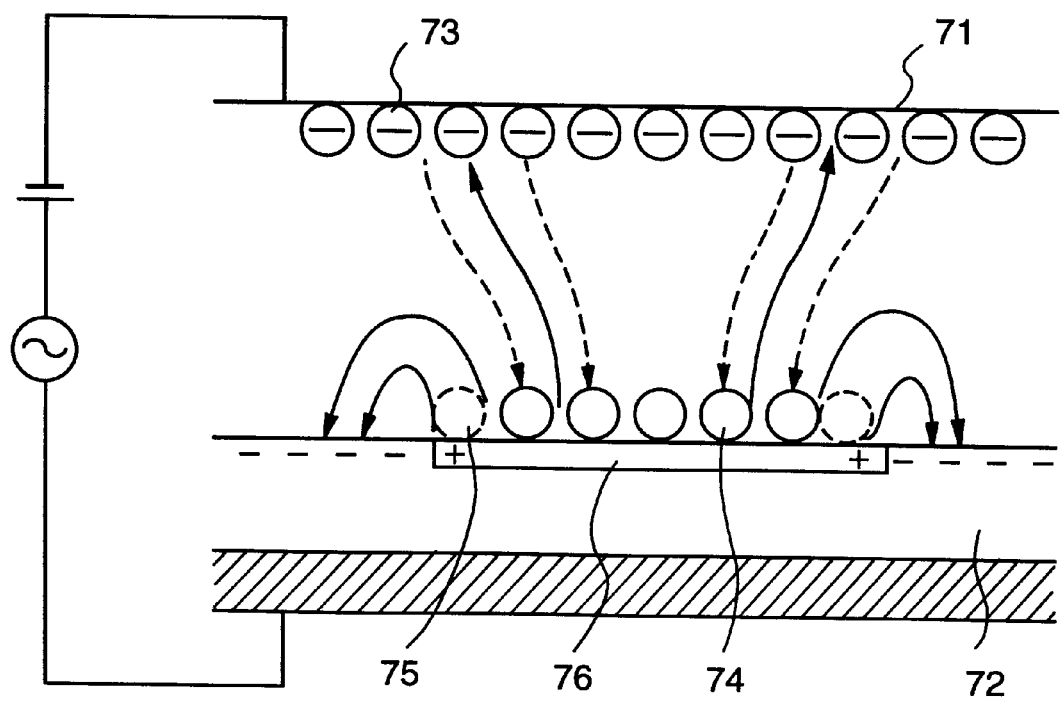
FIG. 8 is a view showing the way a jumping phenomenon occurs in a conventional image processing apparatus.
Figure 9A:
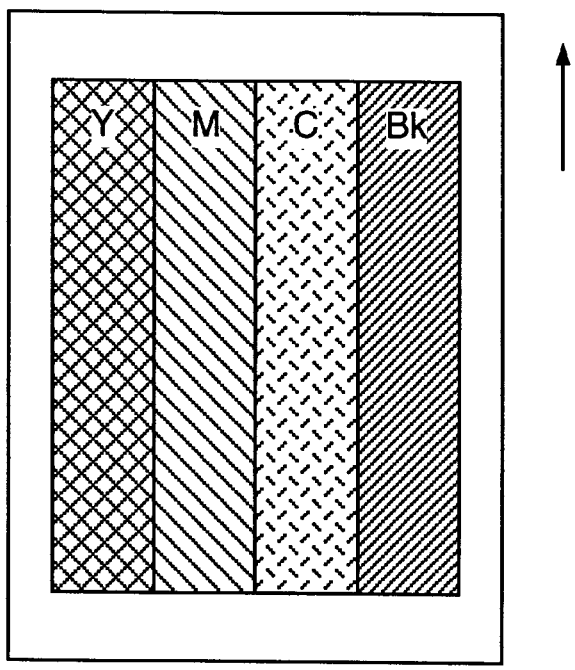
FIGS. 9A and 9B are views showing the way white gaps are formed in the conventional image processing apparatus.
Figure 9B:
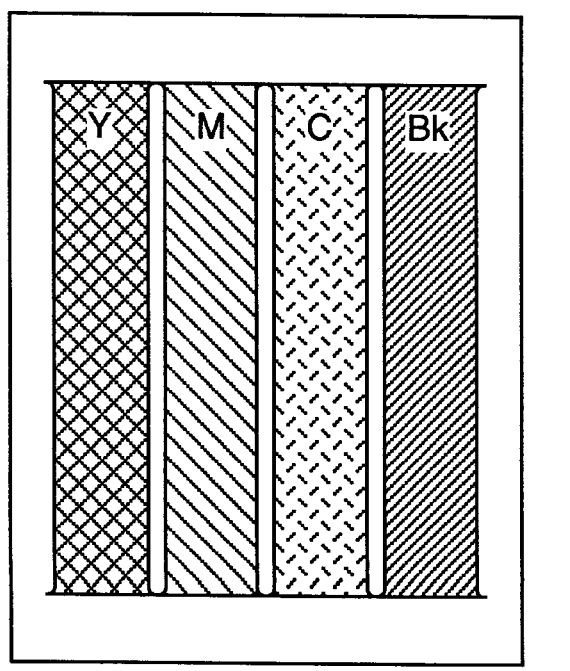
Figure 10A:
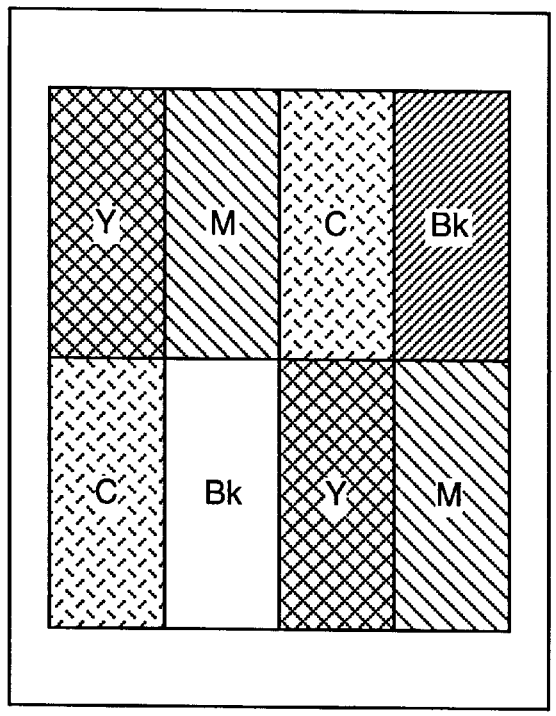
FIGS. 10A and 10B are views showing the way white gaps are formed in the conventional image processing apparatus.
Figure 10B:
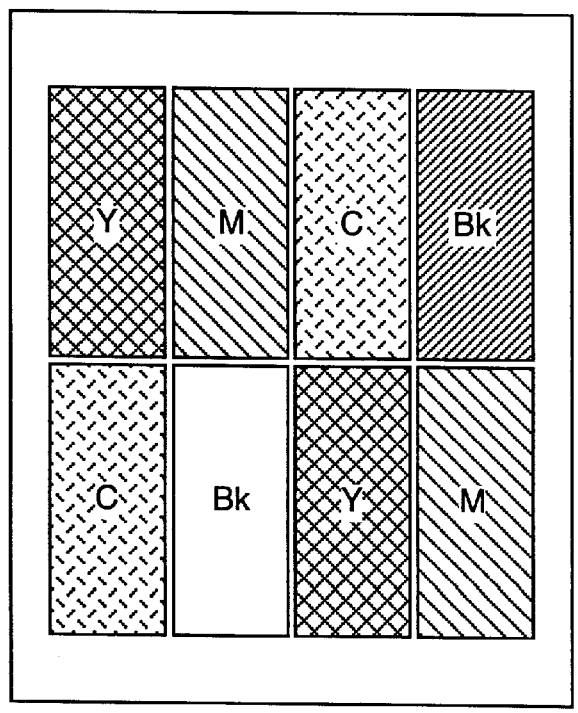

FIG. 7 is a block diagram showing the configuration of a signal processor according to the fourth embodiment of the present invention.

As in the second embodiment, an output from a selector 207 is input to the A input terminal of a selector 214. This value is VD(m,n−1) when $$VD(m,n)-VD(m,n-1) \leq C1$$

and is VD(m,n) when $$VD(m,n)-VD(m,n-1)>C1.$$

VD(m−1,n) is input to the B input terminal.
VD(m,n−1) and VD(m−1,n) are applied to the A and B input terminals, respectively, of a comparator 215. The output from the comparator 215 goes High when $$VD(m,n-1) \leq VD(m-1,n)$$

and goes Low when $$VD(m,n-1)>VD(m-1,n).$$

This output is latched by a DFF 216 and input to an AND gate 217.

The other input terminal of the AND gate 217 is applied with an output from a DFF 212 which latches the comparison result from a comparator 211. This value goes High when $$VD(m,n)-VD(m-1,n) \leq C2$$

and goes Low when $$VD(m,n)-VD(m-1,n)>C2.$$

The output from the AND gate 217 is input to the select terminal of the selector 214. The B input is selected and output when $$VD(m,n)-VD(m-1,n) \leq C2$$

and $$VD(m,n-1) \leq VD(m-1,n),$$

and the A input is selected and output in other cases.

The pixel value which is finally output is the data VD(m−1,n) of the pixel one line before the pixel of interest when $$VD(m,n)-VD(m-1,n) \leq C2$$

and $$Vd(m,n-1) \leq VD(m-1,n),$$

the data VD(m,n−1) of the immediately preceding pixel when $$VD(m,n)-VD(m-1,n) \leq C2$$

and $$VD(m,n-1)>VD(m-1,n)$$

and $$VD(m,n)-VD(m,n-1) \leq C1,$$

and the data VD(m,n) of the nth pixel when $$VD(m,n)-VD(m1,n) > C2$$

and $$VD(m,n)-VD(m,n1) > C1.$$

In this embodiment, when $$VD(m,n)-VD(m-1,n) \leq C2$$

and $$VD(m,n)-VD(m,n-1) \leq C1,$$

VD(m,n−1) of the immediately preceding pixel of the pixel of interest is compared with VD(m−1,n) of the pixel one line before the pixel of interest.

If VD(m,n−1)>VD(m−1,n), VD(m,n−1) is output instead of the pixel of interest. If VD(m,n−1)≦VD(m−1,n), VD(m−1,n) is output instead of the pixel of interest.

As described above, a pixel of interest is compared with its immediately preceding pixel and with a pixel one line before the pixel of interest. In accordance with the comparison results, an image is formed by replacing the value of the pixel of interest with the value of the immediately preceding pixel or with the value of the pixel one line before the pixel interest. This prevents white gaps formed in the boundaries between different colors.

This embodiment is explained by using 8-bit data as an example. However, the present invention is similarly applicable to a binary color printer using one-bit data or a color printer which processes data having a bit width other than 8 bits.

In the above embodiments of the present invention, if the difference between the density value of a pixel of interest and the density value of the immediately preceding pixel of the pixel of interest is a predetermined threshold or less, the value of the pixel of interest is replaced by the value of the immediately preceding pixel. If the difference between the density value of the pixel of interest and the density value of a pixel one line before the pixel of interest is a predetermined threshold or less, the value of the pixel of interest is replaced by the value of the pixel one line before the pixel of interest. In other cases, the value of the pixel of interest is directly output. Consequently, it is possible to prevent white gaps formed in the boundaries between different colors without decreasing the resolution and thereby realize a color image forming apparatus with a high image quality.

The present invention can be applied to a system constituted by a plurality of devices (e.g., host computer, interface, reader, printer) or to an apparatus (e.g., copying machine, facsimile) comprising a single device.

Further, the object of the present invention can also be achieved by providing a storage medium storing program codes for performing the aforesaid functions according to the embodiments to a system or an apparatus, reading the program codes with a computer (e.g., CPU, MPU) of the system or apparatus from the storage medium, and then executing the program.

In this case, the program codes read from the storage medium realize the aforesaid functions according to the embodiments, and the storage medium storing the program codes constitutes the invention.

Further, the storage medium, such as a floppy disk, a hard disk, an optical disk, a magneto-optical disk, a CD-ROM, a CD-R, a magnetic tape, a non-volatile type memory card, and a ROM can be used for providing the program codes.

Furthermore, besides aforesaid functions according to the above embodiments are realized by executing the program codes which are read by a computer, the present invention includes a case where on OS (Operating System) or the like running on the computer performs a part or entire processes in accordance with commands of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, a CPU or the like contained in the function extension board or unit performs a part or entire process in accordance with commands of the program codes and realizes functions of the above embodiments.

Also, in each of the above embodiments, pixel data of a low-density portion is replaced by pixel data of a high-density portion in the boundary between the high and the low-density portions. However, conversion of pixel data of a low-density portion is not limited to replacement. That is, any conversion (e.g., conversion from level 0 to level 1 in 8-bit data) can be performed as long as the density level is increased a predetermined amount by the conversion.

Furthermore, the density change extraction method is not limited to the method of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for supplying a plurality of color-component signals each representing a color-component image to an image forming apparatus for forming a color image by synthesizing the color-component images, comprising:

input means for inputting the plurality of color-component signals representing an input color image of raster sequence;

extracting means for extracting a boundary in which a predetermined density change exists on the basis of the input color-component signals; and replacing means for replacing a value of a pixel on a low-density side of the boundary with a value of a pixel on a high-density side in the boundary in accordance with the result of extraction by said extracting means.

2. The apparatus according to claim 1, wherein the boundary is a portion where a high-density portion changes into a low-density portion.

3. The apparatus according to claim 1, wherein said extracting means extracts the boundary in two-dimensional directions.

4. The apparatus according to claim 1, wherein said extracting means extracts a width of a high-density portion or a low-density portion in the boundary.

5. The apparatus according to claim 1, wherein said image forming apparatus performs nonmagnetic mono-component development.

6. The apparatus according to claim 5, wherein said image forming apparatus performs noncontact development.

7. Image processing method for supplying a plurality of color-component signals each representing a color-component image to an image forming apparatus for forming a color image by synthesizing the color-component images, comprising:

an input step of inputting the plurality of color-component signals representing an input color image in raster sequence;

an extraction step of extracting a boundary in which a predetermined density change exists on the basis of the input color component signals; and a replacing step of replacing a value of a pixel on a low-density side of the boundary with a value of a pixel on a high-density side of the boundary in accordance with the result of extraction in the extraction step.

8. An image processing apparatus comprising:

input means for inputting an image signal;

extracting means for extracting a boundary between a high-density portion and a low-density portion from the input image signal input by said input means;

high-density width detecting means for detecting a region width of a high-density portion adjacent to the boundary from the input image signal input by said input means;

low-density width detecting means for detecting a region width of a low-density portion adjacent to the boundary; and converting means for converting the boundary into a high-density portion if the region width of the high-density portion detected by said high-density width detecting means is not less than a predetermined value and if the region width of the low-density portion detected by said low-density width detecting means is not less than a predetermined value.

9. The apparatus according to claim 8, wherein the region width is the number of pixels.

10. An image processing apparatus for forming a color image by synthesizing predetermined color-component images, comprising:

first calculating means for calculating, for each color component, a difference between a density of a pixel of interest and a density of an immediately preceding pixel of the pixel of interest;

second calculating means for calculating, for each color component, a difference between the density of the pixel of interest and a density of a pixel one line before the pixel of interest;

selecting means for selectively outputting, as the density of the pixel of interest, one of the density of the pixel of interest, the density of the immediately preceding pixel of the pixel of interest, and the density of the pixel one line before the pixel of interest, on the basis of the outputs from said first and second calculating means; and image forming means for forming an image in accordance with the output pixel from said selecting means.

11. The apparatus according to claim 10, wherein said selecting means directly outputs the value of the pixel of interest if the output from said first calculating means is larger than a first threshold and the output from said second calculating means is larger than a second threshold.

12. The apparatus according to claim 11, wherein said selecting means outputs the density of the immediately preceding pixel of the pixel of interest, as the density of the pixel of interest, if the output from said first calculating means is smaller than the first threshold and the output from said second calculating means is smaller than the second threshold, and outputs the density of the pixel one line before the pixel of interest, as the density of the pixel of interest, if the output from said first calculating means is larger than the first threshold and the output from said second calculating means is smaller than the second threshold.

13. The apparatus according to claim 11, wherein said selecting means outputs the density of the immediately preceding pixel of the pixel of interest, as the density of the pixel of interest, if the output from said first calculating means is smaller than the first threshold and the output from said second calculating means is larger than the second threshold, and outputs the density of the pixel one line before the pixel of interest, as the density of the pixel of interest, if the output from said first calculating means is smaller than the first threshold and the output from said second calculating means is smaller than the second threshold.

14. The apparatus according to claim 11, wherein said selecting means outputs the density of the immediately preceding pixel of the pixel of interest, as the density of the pixel of interest, if the output from said first calculating means is smaller than the first threshold and the output from said second calculating means is larger than the second threshold, outputs the density of the pixel one line before the pixel of interest, as the density of the pixel of interest, if the output from said first calculating means is larger than the first threshold and the output from said second calculating means is smaller than the second threshold, and, if the both outputs from said first and second calculating means are smaller than the first and second thresholds, respectively, compares the density of the immediately preceding pixel of the pixel of interest with the density of the pixel one line before the pixel of interest and outputs the larger density as the density of the pixel of interest.

* * * * *

UNITED STATES PATENT AND TRADEMARK OFFICE
CERTIFICATE OF CORRECTION

PATENT NO. : 6,101,286

DATED : August 8, 2000

INVENTOR(S) : SATOSHI SHIMIZU, et al.

It is certified that error appears in the above-identified patent and that said Letters Patent is hereby corrected as shown below:

COLUMN 3

Line 30, "mean s" should read --means--;
Line 31, "t he" should read --the--;
Line 63, "a n" should read --an--.

COLUMN 4

Line 9, "t o" should read --to--.

COLUMN 5

Line 42, "cassette. 17" should read --cassette 17--.

COLUMN 6

Line 51, "t he" should read --the--;
Line 56, "th is" should read --this--.

COLUMN 8

Line 63, "$|VD(n1)-VD(n-2)| \leq C2$" should read --$|VD(n-1)-VD(n-2)| \leq C2$--.

COLUMN 9

Line 62, "ml" should read --m1--.

UNITED STATES PATENT AND TRADEMARK OFFICE
CERTIFICATE OF CORRECTION

PATENT NO. : 6,101,286

DATED : August 8, 2000

INVENTOR(S) : SATOSHI SHIMIZU, et al.

It is certified that error appears in the above-identified patent and that said Letters Patent is hereby corrected as shown below:

COLUMN 11

Line 64, "t he" should read --the--.

COLUMN 13

Line 5, "VD(m,n)-VD(m1,n)>C2" should read --VD(m,n)-VD(m-1,n)>C2--;
Line 7, "VD(m,n)-VD(m,n1)>C1." should read --VD(m,n)-VD(m,n-1)>C1.--.

COLUMN 14

Line 6, "on" should read --an--.

Signed and Sealed this

Twenty-ninth Day of May, 2001

Attest:

NICHOLAS P. GODICI

Attesting Officer     Acting Director of the United States Patent and Trademark Office